United States Patent
Palliyil et al.

(10) Patent No.: US 7,475,427 B2
(45) Date of Patent: Jan. 6, 2009

(54) APPARATUS, METHODS AND COMPUTER PROGRAMS FOR IDENTIFYING OR MANAGING VULNERABILITIES WITHIN A DATA PROCESSING NETWORK

(75) Inventors: Sudarshan Palliyil, Bangalore (IN); Shivakumara Venkateshamurthy, Karnataka (IN); Tejasvi Aswathanarayana, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 749 days.

(21) Appl. No.: 10/735,581

(22) Filed: Dec. 12, 2003

(65) Prior Publication Data

US 2005/0132206 A1    Jun. 16, 2005

(51) Int. Cl.
    *G06F 11/30* (2006.01)
(52) U.S. Cl. .......................................... 726/24; 726/25
(58) Field of Classification Search ................. 713/200, 713/187, 188; 726/24, 25
    See application file for complete search history.

(56) References Cited

U.S. PATENT DOCUMENTS

| | | | |
|---|---|---|---|
| 5,502,815 A | | 3/1996 | Cozza |
| 6,049,671 A | * | 4/2000 | Slivka et al. ................. 717/173 |
| 6,092,189 A | * | 7/2000 | Fisher et al. ................... 713/1 |
| 6,094,731 A | * | 7/2000 | Waldin et al. ................. 714/38 |
| 6,195,695 B1 | | 2/2001 | Cheston et al. |
| 6,275,937 B1 | | 8/2001 | Hailpern et al. |
| 6,298,445 B1 | | 10/2001 | Shostack et al. |
| 6,460,055 B1 | | 10/2002 | Midgley et al. |
| 6,480,097 B1 | | 11/2002 | Zinsky et al. |
| 6,526,418 B1 | | 2/2003 | Midgley et al. |
| 6,577,920 B1 | | 6/2003 | Hypponen et al. |
| 6,721,721 B1 | * | 4/2004 | Bates et al. ..................... 707/1 |
| 6,763,466 B1 | * | 7/2004 | Glover ......................... 726/24 |
| 7,080,000 B1 | * | 7/2006 | Cambridge .................. 703/21 |
| 7,143,113 B2 | * | 11/2006 | Radatti ....................... 707/200 |
| 2003/0046611 A1 | * | 3/2003 | Muttik et al. ................. 714/38 |

FOREIGN PATENT DOCUMENTS

DE    10126752 A1 *  12/2001

OTHER PUBLICATIONS

Internet Engineering Task Force (IETF) Network Working Groups's Request for Comments 1321, "The MD5 Message-Digest Algorithm", R. Rivest, Apr. 1992 (downloaded from Website 'www.ietf.org' on Jul. 4, 2003).

(Continued)

*Primary Examiner*—KimYen Vu
*Assistant Examiner*—Edward Zee
(74) *Attorney, Agent, or Firm*—William Steinberg; Anthony V. S. England

(57) ABSTRACT

Provided are methods, apparatus and computer programs for identifying vulnerabilities to viruses of hacking. Hash values are computed and stored for resources stored on systems within a network. If a first resource or a collection of resources (such as files comprising an operating system, Web Browser or mail server) is associated with a vulnerability, hash values for the first resource or collection of resources are compared with the stored hash values to identify systems which have the vulnerability. Messages may be sent to the people responsible for the vulnerable systems, or the vulnerability may be removed by automatic downloading of patches or service packs.

9 Claims, 8 Drawing Sheets

OTHER PUBLICATIONS

IETF Network Working Group's RFC 3174, "US Secure Hash Algorithm 1 (SHA1)", D. Eastlake 3rd and P. Jones, Sep. 2001 (downloaded from Website 'www.ietf.org' on Jul. 4, 2003).

W. Charlie Hu, Saumitra M. Das and Himabindu Pucha, "Exploiting the Synergy between Peer-to-Peer and Mobile Ad Hoc Networks" (downloaded from Website 'www.usenix.org' on Oct. 21, 2003).

D. Youd, "What is a Digital Signature? An introduction to Digital Signatures" (downloaded from Website 'www.youdzone.com' on Oct. 21, 2003).

W. Roush, "the internet reborn", Technology Review, Oct. 2003, pp. 28-37.

M. Bishop, "An Overview of Computer Viruses in a Research Environment", Technical Report, Department of Math and Computer Science, Dartmouth College, Hanover-NH 03755, 1992.

S. Kumar and E.H. Spafford, "A generic virus scanner in $C^{++}$", in Proceedings of the 8th Computer Society Applications Conference, pp. 210-219, Los Alamitos CA, Dec. 1992, ACM, IEEE Computer Society.

B. Le Charlier, A. Mounji, M. Swimmer, "Dynamic detection and classification of computer viruses using general behaviour patterns", 1995 (downloaded from Website citeseer.nj.nec.com on Nov. 19, 2003).

S. Palliyil et al., "Apparatus, Methods and computer Programs for Identifying Matching Resources within a Data Processing Network", IBM Patent Application filed Dec. 12, 2003.

S. Palliyil et al., "Apparatus, Methods and Computer Programs for Controlling Performance of Operations within a Data Processing System or Network", IBM Patent Application filed Dec. 12, 2003.

S. Palliyil et al., "Method, Apparatus and Computer programs for Enhanced Access to Resources within a Network", IBM Patent Application filed Dec. 12, 2003.

* cited by examiner

APPARATUS, METHODS AND COMPUTER PROGRAMS FOR IDENTIFYING OR MANAGING VULNERABILITIES WITHIN A DATA PROCESSING NETWORK

FIELD OF INVENTION

The present invention provides methods, apparatus and computer programs for controlling performance of operations in a data processing system or network, such as for identifying unchanged files or duplicate files to enable more efficient use of operations such as antivirus scanning or management of a backup copy process.

BACKGROUND

A computer virus is a piece of computer program code that causes unexpected and usually undesirable events within a computer system. Some viruses are very harmful, erasing data or causing the computer's hard disk to require reformatting. A virus is often disguised as something else, and many are designed to be automatically spread to other computers. Viruses can be transmitted as attachments to an e-mail or as downloadable files.

File infector viruses typically attach themselves to program files, usually selected .COM or .EXE files although some viruses can infect any executable program. When the program is loaded, the virus is loaded as well. A file infector virus may arrive at a computer as a self-contained program or script sent as an attachment to an e-mail, or via an infected removable storage medium. System or boot-record infector viruses infect executable code found in certain system areas on a disk. They attach to the disk operating system (DOS) boot sector on diskettes or the Master Boot Record on hard disks, and can make the computer's hard disk temporarily unusable. Macro viruses are among the most common viruses, but tend to do the least damage. Macro viruses can infect an application, such as inserting unwanted words or phrases when using a word processing application.

Because computer viruses are so common, easily transmitted and potentially harmful, anti-virus software is vital to protect against viruses.

Existing anti virus software scans each file for all known viruses that can affect that type of file. If there are N identical files located on M systems within a local area network (LAN), despite the files being identical, each of these N files is scanned by the anti virus program running on the respective local systems.

Additionally, no history is currently maintained about the files which have been scanned to indicate whether the file had been found to be virus-free in the previous scan or not. Regardless of whether the file has been designated as virus-free in a first scan, the file will be re-scanned in subsequent executions of the antivirus software.

Taking regular backups uses a lot of storage space, time and bandwidth. If identical files on different machines are backed up, a copy of each file is maintained in the backup for each machine even though the files are identical. Backup copies may be made even when the file being copied has not changed since the last backup.

Developers of computer viruses often set out to identify and exploit vulnerabilities within computer programs such as operating systems, mail clients, Web servers and Web browsers. When software vendors become aware of a vulnerability, they often notify existing customers and provide program code for removing the vulnerability. The program code may be a code patch (typically small), a service pack (typically large, such as 100 MB) or a replacement version of the computer program. Each end user is typically required to check which operating system version (and/or other programs) they are running and to compare this with received information about vulnerable programs. Applying a patch or service pack to remove a vulnerability typically involves each user locating the patch or service pack (via mail or Web site searching), downloading the patch or service pack, installing the program code, and rebooting the computer system. If N patches are required, the above described sequence is repeated N times.

It is common for vulnerabilities to viruses to persist within large networks for an unacceptably long time, because removal of the vulnerability requires pro-active steps by many individuals. This exposure can be reduced by managers or the information technology (IT) department within an organisation carefully checking that action has been taken to resolve the vulnerability for all users' systems, but pro-active involvement of managers or IT service teams involves significant costs to the organisation.

The inventors of the present invention have identified the above issues, and the need for solutions that can mitigate one or more of the above-described problems.

SUMMARY

A first embodiment of the invention provides a method for identifying data processing systems within a network having vulnerabilities to computer viruses or computer hackers. A set of hash values is computed for a set of resources distributed across a plurality of data processing systems of a network. The computed set of hash values is stored at a first data processing system within the network, together with an identification of the respective one of said plurality of data processing systems storing the resource corresponding to each computed hash value. Following identification of a first resource which has an associated vulnerability to a computer virus or hackers, at least one hash value is computed for the first resource and compared with the stored set of hash values to identify matching hash values. If the relevant hash values are identified, the identification of respective systems which is stored together with stored hash values is used to determine which data processing systems hold a replica of the resource associated with the vulnerability. The data processing systems holding a replica of the resource or holding the relevant combination of resources can then be classified as vulnerable, or investigated further.

Where a vulnerability is associated with a specific combination of resources, the comparison of hash values can look for a specific logical combination of hash values corresponding to the problematic combination of resources. This may involve using hash value comparisons to identify a specific combination of resources and the absence of a relevant patch.

The method may include patching or replacing replicas of the first resource of resources, at a number of systems identified as storing copies of the resource, to remove the vulnerability. A method such as described above may reduce the overhead of managing resolution of vulnerabilities to computer viruses or hacking, while enabling increased automation and centralized control of protection from virus attacks and hackers. The term 'virus' as used in the present specification includes worms (self-replicating programs which may include viral payloads), trojan horses (apparently harmless files which contain viruses) and similar virulent, malicious or undesirable programs.

For the purposes of this specification, a resource may be a single data file or executable file, or a group of files such as a Zip-compressed group of files (within a .zip file) or the set of files which combine to form an application program or an operating system. An operating system and an application program are examples of resources, but typically comprise multiple files which are each also referred to herein as resources or component resources. Hash values may be separately computed for each component resource. Applying a secure hash function to the bit pattern representing such files or groups of files, and comparing with other hash values, may involve significantly less processing than decompressing and virus scanning each replica file.

The terms 'copies' and 'replicas' of a resource as used herein do not imply any distinction from an 'original' resource—all instances of a resource may have the same status and the term 'replicas' is intended to include all identical resource instances. If an identical hash value is derived from each of N instances of a file, the N instances are identical and are referred to herein as N replicas.

The hash values may be computed on the local computer system on which a resource is stored, and then sent to a repository at a pool server system. A pool server is a data processing system within the network storing information (including hash values) relating to resources distributed across a plurality of data processing systems within the network. The comparisons can then be performed at the pool server on behalf of a number of connected computer systems, to determine which resources on which computer systems have matching hash values and so are replicas.

A second embodiment of the invention provides a data processing apparatus, including a data processing unit, a data storage unit, a repository manager and a vulnerability coordinator. The repository manager is configured to store a set of hash values and associated system identifiers in a repository within the data storage unit. The set of hash values are derived from and represent a set of resources distributed across a plurality of data processing systems, and the system identifiers identify particular systems within the plurality of data processing systems at which the resources are stored. The vulnerability coordinator computes or receives a hash value derived from and representing a first resource and uses this to identify replicas of a resource. In particular, the vulnerability coordinator is configured to respond to a determination that the first resource has a vulnerability to a computer virus or hacking, by comparing the computed hash value for the first resource with the stored set of hash values. The comparison identifies any matching hash values. The identification of matches between the hash value of the first resource and stored resources, and the stored system identifiers, are used to identify systems within the plurality of data processing systems storing replicas of the first resource. The identified systems are then classified as vulnerable.

A further embodiment of the invention provides a distributed data processing system comprises a data processing system as described in the previous paragraph (referred to hereafter as the server system) and a plurality of client data processing systems. A set of resources is distributed across a plurality of client data processing systems and hash values derived from the resources are stored at the server system. The comparison of hash values is performed for hash values stored in the repository at the server system to identify combinations of resources on the client systems that indicate vulnerabilities. The terms client and server as used herein are not intended to indicate a specific type of data processing apparatus but only to indicate the nature of the relationship between the systems for the purposes of performing the present invention. The server system may be implemented by any data processing apparatus which is capable of storing the repository and executing the vulnerability coordinator, and the client data processing systems may be any apparatus capable of storing one or more of the resources.

Further embodiments of the invention provide computer programs for controlling the performance of a method as described above, within a data processing apparatus or across a plurality of data processing systems in a network. The computer program may be made available as a program product comprising program code recorded on a machine-readable recording medium, or via an electronic transfer medium.

Further embodiments and advantages of the invention are described in the detailed description of embodiments below.

BRIEF DESCRIPTION OF DRAWINGS

Embodiments of the invention are described in detail below, by way of example, with reference to the accompanying drawings in which.

DETAILED DESCRIPTION OF EMBODIMENTS

Figure 1:
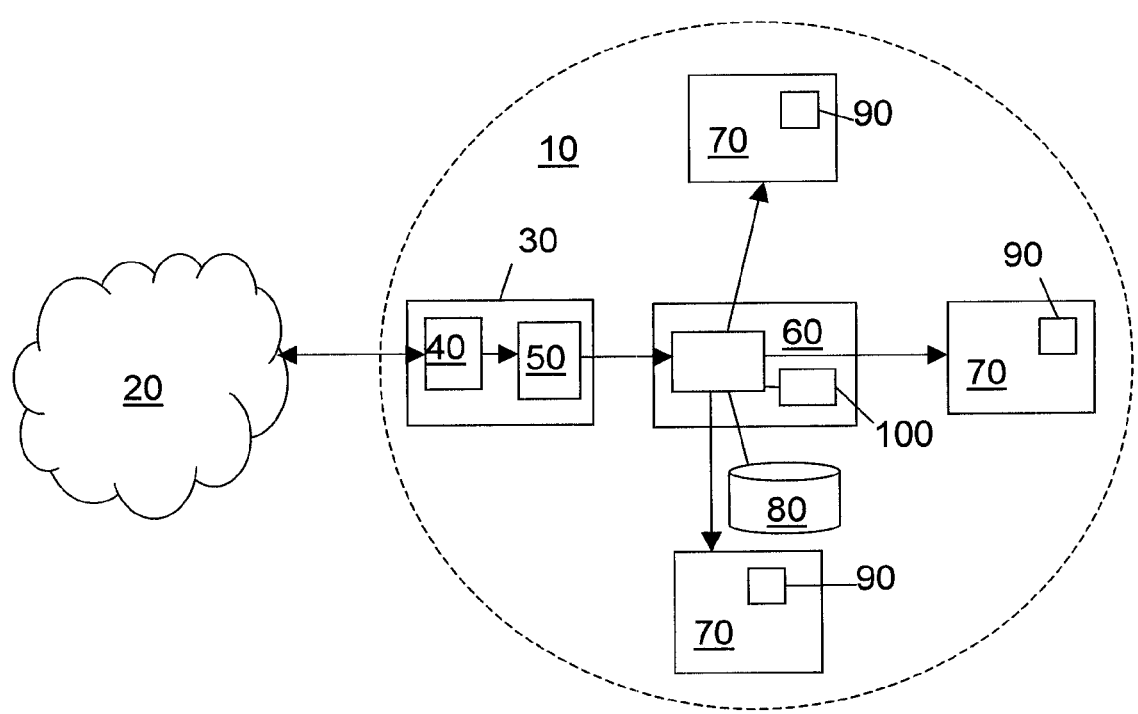
FIG. 1 is a schematic representation of an example computer network, in which the present invention may be implemented.

A first embodiment of the invention is described below in terms of a set of logical components of a data processing network, which cooperate to control of the performance of operations within the network to reduce duplication of processing. The logical components include computer programs executing on systems within the network, repositories within those systems, and resources such as programs and data files.

It will be apparent to a person skilled in the art that individual steps of the method described below can be implemented in computer program code and that a variety of programming languages and coding implementations may be used to implement the methods described herein. Moreover, the computer programs are not intended to be limited to the specific control flow described below, and one or more of the described steps of a program may be performed in parallel rather than sequentially as described. One or more of the operations described in the context of a computer-program-controlled implementation could alternatively be performed by a hardware electronics component.

Some portions of the following description refer to 'algorithms' for performing operations on data within a computer memory. An algorithm is conceived to be a self-consistent sequence of steps leading to a desired result. The steps are those requiring physical manipulations of physical quantities. Usually, these quantities take the form of electrical or magnetic signals capable of being stored, transferred, combined, compared, and otherwise manipulated. It is frequently convenient to refer to these signals as bits, values, elements, characters, numbers, or the like. It should be borne in mind, however, that the above and similar terms are to be associated with the appropriate physical quantities and are merely convenient labels applied to these quantities. Unless specifically stated otherwise, discussions within the present specification utilising terms such as "computing", "calculating", "determining", "comparing", "generating", "selecting", "outputting", or the like, refer to the action and processes of a computer system, or similar electronic device, that manipulates and transforms data represented as physical (electronic) quantities within the registers and memories of the computer system into other data similarly represented as physical quantities within the computer system memories or registers, or other such information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and methods described below are not inherently related to any particular computer or other apparatus. Various general purpose machines may be used with programs in accordance with the teachings herein. Alternatively, the construction of more specialised apparatus to perform the required method steps may be appropriate.

In addition, the present specification also discloses a computer readable medium for storing a computer program for performing the operations of the methods. The computer readable medium is taken herein to include any transmission medium for communicating the computer program between a source and a destination. The transmission medium may include storage devices such as magnetic or optical disks, memory chips, or other storage devices suitable for interfacing with a general purpose computer. The transmission medium may also include a hard-wired medium such as exemplified by typical Internet-connected server computers, or a wireless medium such as exemplified in the global system for mobile communications (GSM) mobile telephone system.

Where steps or features in any of the accompanying drawings are referenced by the same reference numerals, those steps and/or features have the same or similar functions or operations in the context of the present description (unless the contrary intention appears).

FIG. 1 shows an example local area network (LAN) 10 connected to a wider network 20 via a network gateway server 30. The network gateway server 30 is running firewall software 40 and routing software 50. A central server 60 is connected to the gateway server 30 and to a plurality of personal computers 70. At least the central server 60 has associated persistent storage 80. Embodiments of the invention have applicability within a single computer, such as one of the computers shown in the example network, in network applications for simple local area networks as shown, and in more complex networks.

A typical solution for virus protection in such a network includes antivirus software running as part of the firewall 40 on the network gateway server, for scanning incoming data such as e-mails. Antivirus software 90 is also installed and configured to run periodically on each computer of the network, and in response to user-generated commands. According to an embodiment of the present invention, the antivirus program 90 running on each personal computer 70 includes functions not provided by conventional antivirus programs. According to a distributed solution described below, a virus scan coordinator program 100 runs on the central server 60.

In a local area network environment, it is common for each personal computer 70 to have a similar set of installed computer programs, and for some of the data files stored within the LAN to be replicated across several computers in the network. Therefore, periodic executions of the antivirus software typically involve scanning identical data files and executable files on many different computers. The periodic virus scans involve scanning newly created and newly installed files, but also repeating virus scans of files which were already in existence when the last virus scan was performed. The pre-existing files may not have changed since the last scan, but repeated scanning of pre-existing files has previously been considered essential for protection because timestamps on files cannot be relied on as evidence that the files have not changed.

The inventors of the present invention have identified these issues as problems requiring a solution. Embodiments of the invention described below use a comparison of hash values computed from the bit patterns representing stored files to identify which files have changed since the last virus scan. The embodiment avoids full virus scanning of files which have not changed since the last scan. Another feature, or alternative embodiment, of the invention also uses a comparison of hash values to identify replicas of files to avoid repetitious virus scanning of multiple replicas. Further embodiments are described thereafter.

A number of hashing algorithms are known for use in cryptographic solutions—such as digital signature applications where a large file must be compressed in a secure manner before being encrypted. An example is the MD5 Message-Digest algorithm as described in the Internet Engineering Task Force Network Working Group's Request for Comments 1321, "The MD5 Message-Digest Algorithm", R. Rivest, April 1992. MD5 produces a 128-bit hash or digest of an input of arbitrary length—providing security in the sense that it has been considered 'computationally infeasible' to produce two messages with the message digest, or to compute a message having a pre-specified target message digest. This does not mean that the MD5 algorithm is totally unbreakable, and a more secure algorithm is preferred for implementing the present invention.

The Secure Hash Algorithm (SHA) is another hash function, specified in the Secure Hash Standard (SHS, FIPS 180) and revised in 1994 to produce SHA-1. SHA-1 is described in the IETF Network Working Group's RFC 3174, "US Secure Hash Algorithm 1 (SHA1)", D. Eastlake $3^{rd}$ and P. Jones, September 2001. SHA-1 takes a message of less than $2^{64}$ bits in length and produces a 160-bit message digest. SHA-1 is slightly slower but more secure than MD5.

Other hash functions are also known, including a number which are currently considered 'secure' which have output hashes of 160 to 512 bits, such as RIPEMD-160 (a 160-bit cryptographic hash function, designed by Hans Dobbertin, Antoon Bosselaers and Bart Preneel) and WHIRLPOOL (a hash function designed by Vincent Rijmen and Paulo Barreto which operates on messages less than $2^{256}$ bits in length, and produces a message digest of 512 bits).

The level of security of a hash, as determined by the number of output bits and the hashing algorithm, indicates the strength of its non-collision property. The specific hash algorithms mentioned above are for illustrative purposes only. The choice of a specific hash function can be made according to the computing power available at implementation or deployment time, and other characteristics of the hardware and software environment, to ensure an optimum balance between security and speed. A suitable hash function H is a hash function which satisfies the non-collision property such that it is computationally infeasible, at the time of deployment, to find a message y not equal to a message x such that $H(x)=H(y)$. The SHA-1 algorithm, which produces message digests having 160 bits and is (at the time of writing) considered appropriate for many digital signature applications, is an example of an algorithm which is appropriate (at the time of writing). In general, hashes of a length considered appropriate for digital signature applications at a particular point in time will also be appropriate for implementing the present invention at that point in time.

Secure hashes (such as those generated using SHA-1) are 'computationally unique' for a specific bit pattern. This means that the likelihood of two identical hash values arising from hashing two different files—referred to as a 'collision' between hashes—is very low. Techniques described below exploit this 'uniqueness' property of the secure hashes to determine whether a file has been modified in the period between the previous virus scan and the present virus scan. If the file has been modified, a hash value computed after the change will differ from a hash value computed before the change, and this difference determines that another virus scan is required. If the hash value matches, the file is assumed not to have changed, and so the previous virus scan result is relied on. In this way, secure hashes computed for each of a set of files are used to identify the files that have to be scanned in a virus scan.

Also described are techniques which enable a reduction of virus scanning of replica resources (for example, duplicates in backup storage, or multiple replicas distributed across a network). Matches between secure hashes are used to identify replica resources and the result of a virus scan of a resource is used in relation to one or more replicas of the resource. Also disclosed are techniques for identifying data processing systems within a network which have vulnerabilities to virus attacks, using secure hash values as identifiers of resources known to be associated with such vulnerabilities.

Figure 2:
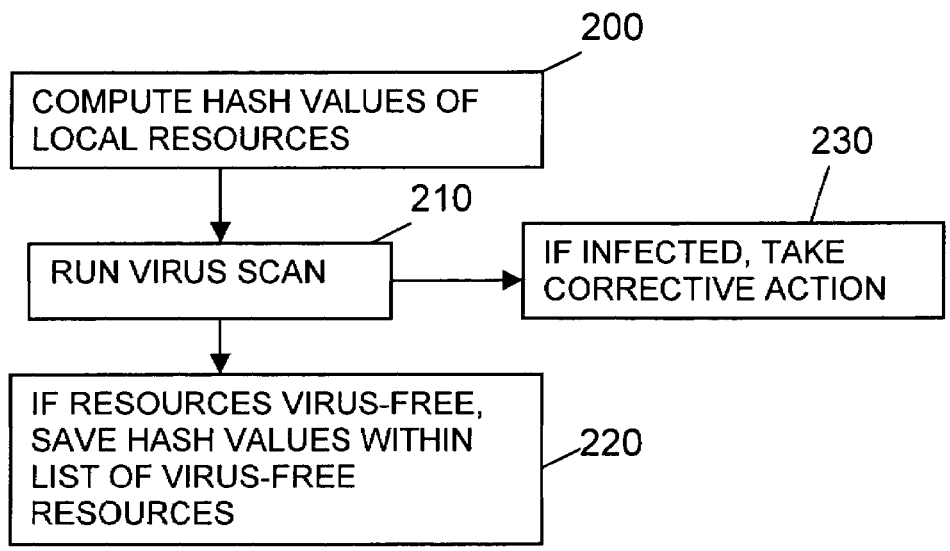
FIG. 2 is a flow diagram showing some steps of a method according to an embodiment of the invention.
Figure 3:
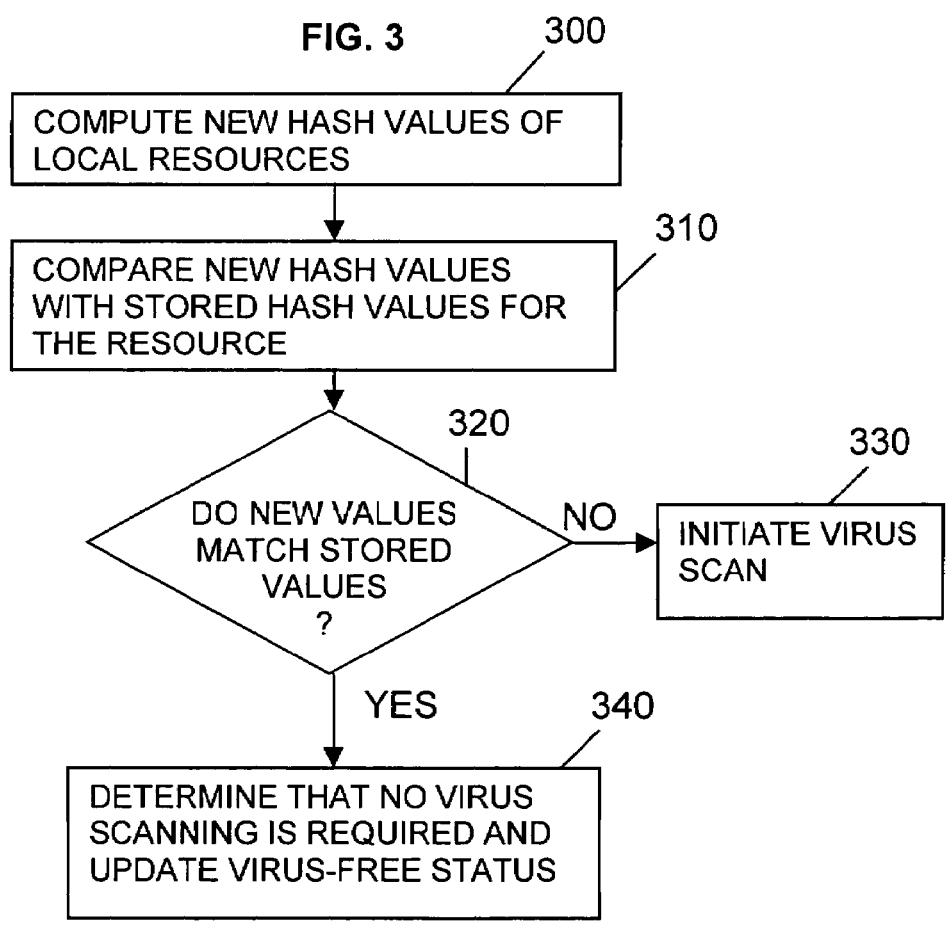
FIG. 3 is a flow diagram showing some steps of a method according to an embodiment of the invention.

A method according to one embodiment of the invention is summarized in the schematic flow diagrams of FIGS. 2 and 3. A more detailed description of an embodiment of the invention is provided with reference to FIGS. 4, 5 and 6.

Referring to FIGS. 1 and 2, an initial execution 210 of an antivirus program 90 running on a data processing system 70 within a local area network 10 may scan all of the local system's files for computer viruses, or may scan a subset of files specified by a user. A periodic virus check of all files may be required by the user's employer. The local antivirus program 90 also invokes a message digest function (which may be an integral module of the antivirus program 90) to compute 200 hash values for resources of the system 70. A system's resources include the data files and executable files stored on the system. The message digest function is applied to a bit pattern of each potentially infectable file, to each new file and to any file having a last-modification timestamp which differs from the timestamp of the last virus check.

If the resources are found to be virus-free, this fact is recorded 220 together with the computed hash values. Thus, a list of hash values is generated for resources classified as virus-free, and this list is stored on the local system. In one embodiment of the invention (described in detail below with reference to FIGS. 4, 5 and 6), the generated list of hash values for the virus-free resources of each system in the LAN is sent to a repository 80 on a pool server 60. The pool server provides storage facilities for storing information relating to resources on all of the systems within the LAN, including the list of hash values for resources identified as virus-free and copies of selected resources of the different systems.

If infected resources are identified, action is taken 230 to isolate ("quarantine") the virus and actions may also be taken to decontaminate or remove the infected resource. The quarantining and decontamination steps may use known virus-protection techniques at each system, or alternatively decontamination steps may be performed at the pool server on behalf of a number of systems in the network and a copy of the decontaminated version of the resource may be sent to the other systems.

Subsequently, as shown in FIG. 3, new hash values are computed 300 when a virus check is required—either periodically or when triggered by user actions. The periodicity of scheduled virus checks is determined by settings of the antivirus program 90 running on the local system 70. The new computed hash values are compared 310 with the stored hash values and a determination is made 320 regarding whether the new hash values match the respective stored hash values. A match between respective new and stored hash values indicates that the respective resources have not changed since the last scan 210 determined that the resources were virus-free. Resources for which the stored and newly computed hash values match can be assumed to be virus-free—because virus contamination (or any other change) would have resulted in a different hash value being computed. Identification of a match between respective stored and new hash values leads to a determination 340 that no virus scanning is currently required for the relevant resource, and the virus-free status of the resource is updated by adding a new timestamp.

However, any difference between the stored and new hash values implies that earlier virus scan results cannot be relied upon. Therefore, a virus scan is initiated 330 for any new resource (any resource which did not exist when the last virus scan was carried out) and any other resource which does not have matching old and new hash values. If the virus scan finds that a new resource is virus-free, the new hash value is stored in a list of virus-free resources.

Figure 4:
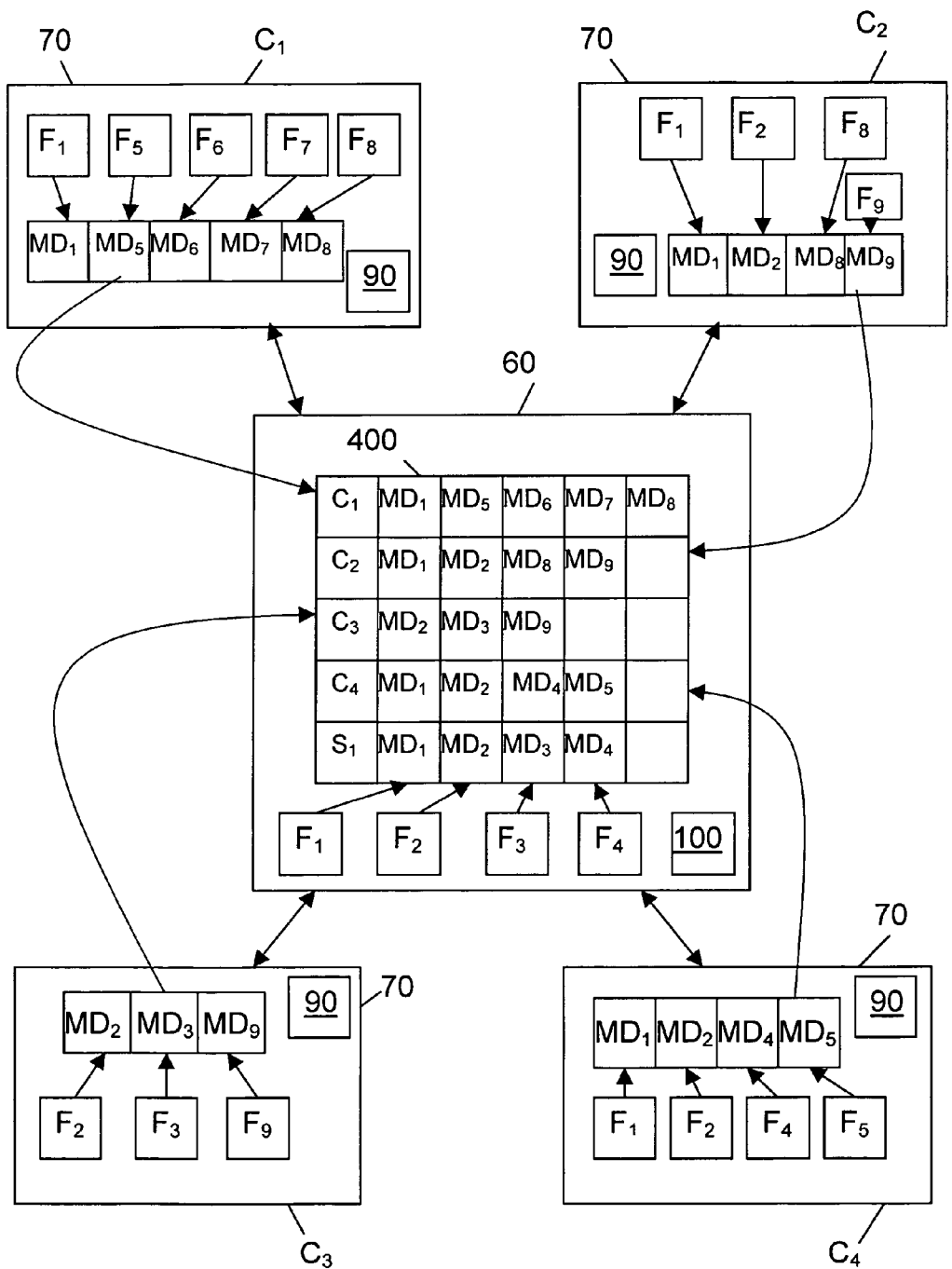
FIG. 4 is a schematic representation of transmission of locally-generated hash values for a set of distributed resources to a pool server, and storing of the hash values in a central repository, according to an embodiment of the invention.
Figure 5:
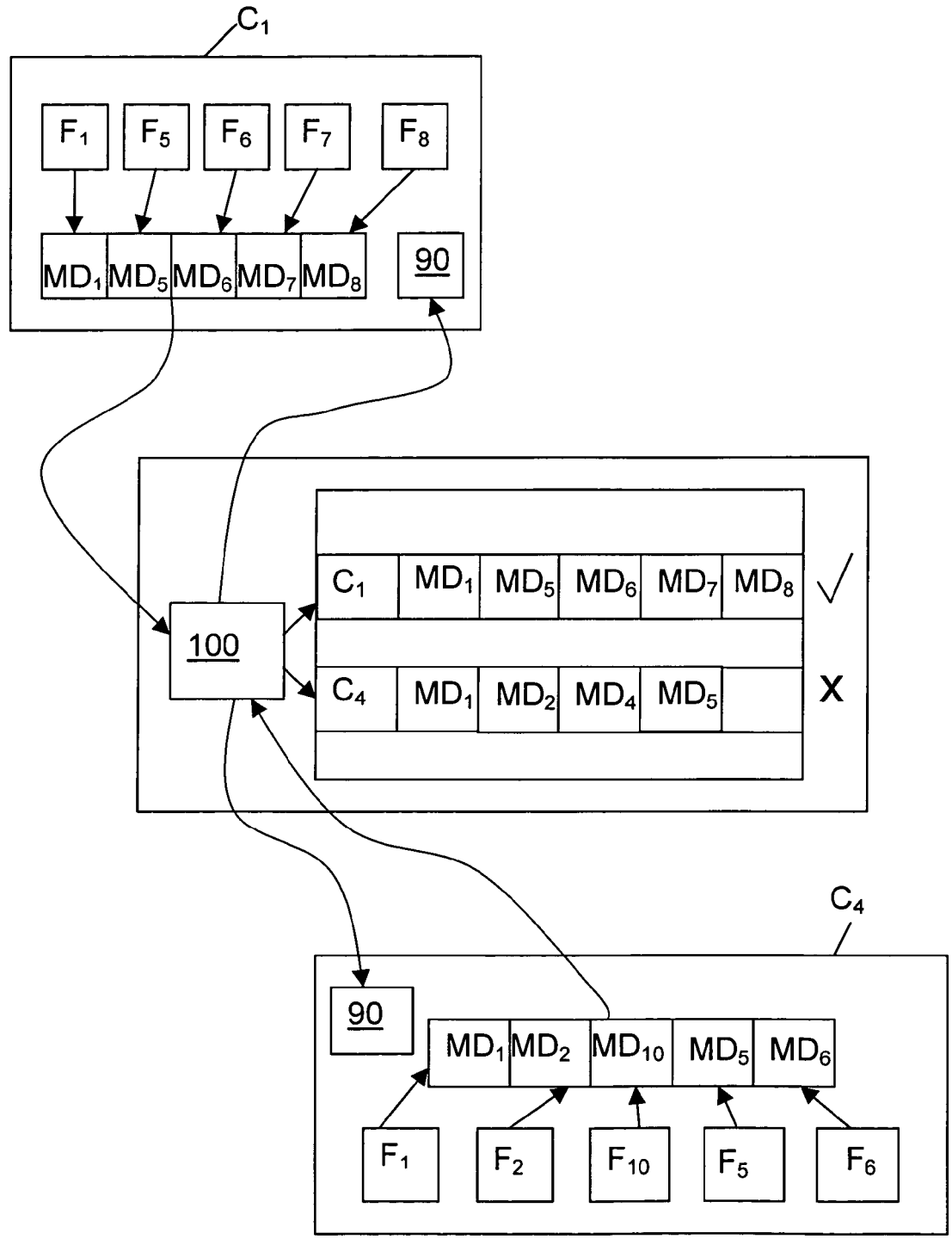
FIG. 5 is a schematic representation of a comparison between locally computed hash values and hash values stored in the central repository of FIG. 4.
Figure 6:
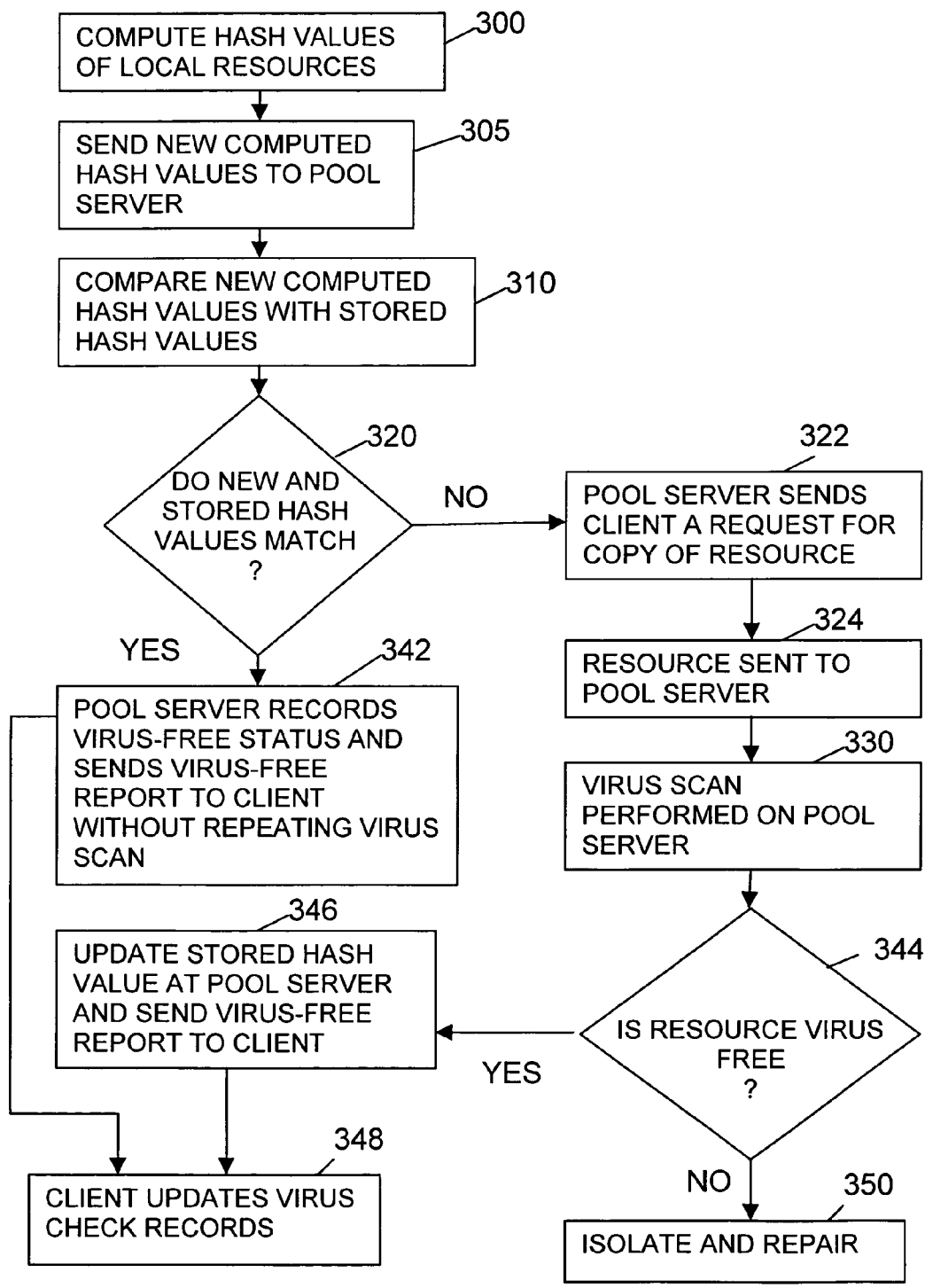
FIG. 6 is a flow diagram showing the steps of a method according to an embodiment of the invention.

Referring to FIGS. 4 and 6, a distributed architecture according to one embodiment of the invention comprises a pool server data processing system 60, which includes one or more repositories 400 storing data on behalf of the local server itself and on behalf of the other data processing systems 70 in the local area network 10. In particular, the pool server's repositories 400 store hash values for files stored on each of the data processing systems within the LAN which files have been classified as virus-free. In a simple LAN, such as shown in FIG. 1, the pool server system may be a central server 60 or any one of the systems in the LAN which is capable of maintaining the repository 400 and running virus scan coordinator software 100. Of course, a more complex LAN may comprise tens or hundreds of interconnected computer systems and may form part of a wider network (a wide area network (WAN), intranet or the Internet).

FIG. 4 is a schematic figure showing a number of files $F_1$, $F_2$, ... $F_9$ distributed across a number of data processing systems within a LAN 10. Many of the files have replicas elsewhere in the LAN—for example, file $F_1$ is replicated on each of systems $C_1$, $C_2$, $C_4$ (70) and $S_1$ (60), but not $C_3$ in this example.

An antivirus program (either a client antivirus program 90 or a virus-scan coordinator 100) runs on each system 70,60 within the LAN 10. The antivirus programs 90,100 each include a message digest function (for example, a function implementing the SHA-1 algorithm). For each data file or executable file for which virus scanning is applicable, the message digest function running on the local system 60, 70 is used to compute 200 a Message Digest (hash value) $MD_1$, $MD_2, \ldots MD_9$, where $MD(F_N)=MD_N$.

In a particular embodiment, hash values are computed for only a subset of files on the system, comprising the file types which can contain executable components. Such files include .exe, .com, .dll, .nsf, .zip, .cab, .lwp and .doc files (since .doc files can contain macros). Although file name extensions cannot be relied upon as evidence of a file type, a file having a name extension indicating a non-executable file type is generally not independently executable without renaming. That is, although virulent code could rename a file falsely named as a non-executable '.txt' file (for example) and execute any viral contents, a virus within the '.txt' file should not be independently executable. Therefore, protection against viruses which could invoke viruses embedded in nominally non-executable files may provide adequate protection—at least for some virus checks.

Thus, recomputing of hash values may optionally be omitted for file types which do not contain executable code, for some virus checks. The invention may be implemented to allow file type selection for selective computation of hash values for some virus checks, but to require computation of hash values for all files for other checks. The determination of whether selection is permitted or not may be made according to the current system workload, or which operations are running in the system or according to how the virus check was initiated.

For example, files $F_1$, $F_5$, $F_6$, $F_7$ and $F_8$ are stored (held in volatile memory or persistent disk storage) on system $C_1$. The message digest function computes 200 respective hash values for each file—$MD_1$, $MD_5$, $MD_6$, $MD_7$ and $MD_8$. Similarly, files $F_1$, $F_2$, $F_3$ and $F_4$ are stored on system $S_1$ (60) and the locally executing message digest function computes 200 respective hash values $MD_1$, $MD_2$, $MD_3$ and $MD_4$. The antivirus program 90, 100 executes 210 to determine whether the locally-stored files are virus-free. If files are determined to be infected by a virus, corrective action is taken 230 in accordance with known isolation and decontamination techniques.

If the scanned resources are classified virus-free, the local antivirus program 90, 100 transmits the corresponding hash values $MD_1, \ldots, MD_N$ to the repository 400 on the pool server system $S_1$ (60). Data transmission between a personal computer 70 and the pool server 60 takes place over a secure channel, which may implement Secure Sockets Layer (SSL) security for example. In the case of client antivirus programs 90 executing on the personal computers 70, the local antivirus programs 90 send their hash values to the virus scan coordinator program 100 running on the central server 60, and the virus scan coordinator 100 updates 220 the repository 400.

After the steps described above (and summarized by steps 200-220 in FIG. 2) have been carried out for each system in the network, each system holds a set of hash values associated with the locally stored set of resources which potentially require virus scanning. As shown in FIG. 4, the repository 400 on the pool server 60 includes hash values for all of the resources on systems within the LAN that potentially require virus scanning. The repository 400 may also store an indication of the contamination state of each resource (such as 'virus-free', 'contaminated', or 'virus-check expired'). Let us assume that, at a certain point in time, all of the resources on each system in the LAN have been classified virus-free. The stored hash values can then be used to improve resource usage during subsequent executions of the virus scanning programs, as described below.

FIG. 6 is a flow diagram showing a sequence of steps performed during cooperation between one of the personal computers 70 and the pool server 60. By way of example only, the steps are described with particular reference to systems $C_1$ and $C_4$ of FIGS. 4 and 5.

Upon expiry of a predefined time interval for virus scans or when initiated by user actions, the message digest function of the antivirus program 90 running on system $C_1$ computes 300 a new set of hash values $MD_1$, $MD_5$, $MD_6$, $MD_7$ and $MD_8$ for the set of installed files $F_1$, $F_5$, $F_6$, $F_7$ and $F_8$. The antivirus program 90 on system $C_1$ sends 305 the new set of hash values to the virus scan coordinator program 100 running on the pool server 60. The virus scan coordinator program 100 on the pool server identifies the set of hash values held in the repository 400 for system $C_1$, and compares 310 the stored set of values with the newly computed set of values for $C_1$. The comparisons determine 320 whether each of the newly computed set of hash values matches a hash value stored in the repository 400 for system $C_1$.

If the determination 320 has a positive result for the entire set of hash values for system $C_1$, the virus scan coordinator program 100 running on the pool server $S_1$ updates the repository 400 by saving an updated timestamp in association with the existing record of the virus-free status of the files on system $C_1$. The virus scan coordinator program 100 sends 342 a report to the system $C_1$ indicating that the set of files on the system $C_1$ are virus-free. The client antivirus program 90 running on the system $C_1$ also records 348 a timestamp for the current virus check. This updating of timestamps is not essential to all embodiments of the invention, since hash values may be computed, stored and compared without reference to timestamps.

Thus, the determination that no files have changed since the previous virus scan, together with the previous determination that all files are virus free, has been used to determine that no files currently require virus scanning. In this example, a virus check has been performed without execution of a full virus scan for any resources.

Similarly, the message digest function of the client antivirus program 90 running on system $C_4$ computes 300 a new set of hash values $MD_1$, $MD_2$, $MD_{10}$, $MD_5$ and $MD_6$. Of the set of files stored on system $C_4$, files $F_1$, $F_2$ and $F_5$ are unchanged since the last virus scan, and so their hash values ($MD_1$, $MD_2$ and $MD_5$) are also unchanged. However, since the last virus scan, a new file $F_6$ has been added and file $F_4$ has been modified to create file $F_{10}$, resulting in new hash values $MD_6$ and $MD_{10}$. The client antivirus program 90 running on system $C_4$ sends 305 the new set of hash values to the virus scan coordinator program 100 on the pool server 60. The virus scan coordinator program 100 identifies the relevant set of stored hash values ($MD_1$, $MD_2$, $MD_4$, $MD_5$) for system $C_4$ in the repository 400 and performs a comparison 310 with the received new hash values. The comparison determines 320 that there is a mismatch between some of the newly computed hash values and those stored in the repository 400 at the pool server 60.

In response to the identification of a mismatch, the virus scan coordinator program 100 running on the pool server sends 322 a request via the client antivirus program 90 running on the system $C_4$ for a copy of the resources corresponding to the non-matching hash values $MD_6$ and $MD_{10}$. The receiving client antivirus program 90 uses the hash values $MD_6$ and $MD_{10}$ as pointers to identify files $F_6$ and $F_{10}$, and sends 324 the files $F_6$ and $F_{10}$ to the virus scan coordinator program 100. The virus scan coordinator program 100 executes 330 its virus scanning functions on the pool server 60 to determine 344 whether the files $F_6$ and $F_{10}$ are contaminated or virus-free.

If any files are contaminated, virus-protection functions such as quaratining or decontaminating are performed 350, initially on the pool server. The coordinator program also alerts the client antivirus program 90 running on system $C_4$ that specific files have been found to be contaminated, and either provides a copy of a decontaminated version of files $F_6$ and $F_{10}$ or prompts the client antivirus program 90 on system $C_4$ to perform 350 quarantining or decontamination. If all files are determined 344 to be virus-free, the virus scan coordinator program 100 updates the repository 400 by replacing the previous set of hash values $MD_1$, $MD_2$, $MD_4$ and $MD_5$ with the newly computed set of hash values $MD_1$, $MD_2$, $MD_{10}$, $MD_5$ and $MD_6$, and recording 346 the virus-free status of the files corresponding to these hash values. The coordinator program then sends a virus-free status report to the system $C_4$ and the locally-executing client antivirus program 90 also records 348 the virus-free status of the resources stored on system $C_4$.

Note that a full virus check has been performed for system $C_4$ without scanning the majority of the files on the system. Although the proportion of files requiring a virus scan will depend on the proportion of files which are new or have been modified since the last virus check, only a small subset of files on a system are typically added or modified between consecutive virus checks and so a typical virus scan can be limited to a subset of files.

The above-described method can be implemented with an additional feature for identifying replicas of files using comparison of hash values. By avoiding virus scanning of multiple replica files, repetition of virus scanning can be reduced.

Note that the repository 400 shown schematically in FIG. 4 includes hash values for the set of resources of a plurality of different data processing systems within the LAN. The set of hash values of different systems are compared to identify replication of files between the different systems. As noted above, and referring to steps 342 and 346 of FIG. 6, the virus scan coordinator program 100 sends a virus-free status report to the system for which the virus check was required. When the replica-identification feature is implemented, the coordinator also sends the virus-free status report to any other systems within the plurality of data processing systems which hold a copy of resources determined to be virus-free (by steps 310,320 or steps 330,344). This identification of replicas is described below in more detail, including with reference to FIG. 9.

Virus-contamination-status reports (including hash values, an indication of the contamination status, and optionally other metadata) may be encrypted before being sent from the pool server to client data processing systems. Conventional cryptographic techniques may be used. A further computation of hash values for local resources (and comparison with the hash values within the virus-contamination reports) may be performed at each client data processing system before recording a virus-free status for each resource. Such checks at the client system ensure that a virus check which was based on out-of-date hash values stored in the pool server, is only relied on to update the local virus-contamination status information if the resources are still identical to those stored at the pool server.

For those files with hashes that are not certified virus-free, the virus scan coordinator program 100 runs on the pool-server to scan the files for computer viruses and, in some cases, to take corrective action. The subset of files which require virus scanning, and which are not already stored on the pool server, may be transferred to the pool-server 60 following a determination that scanning is required for that subset. The files are then scanned for viruses, and the result of the scan is reported to at least those systems holding one or more of the subset of files. A decontaminated version of a file may be generated by the antivirus program 100 on the pool server and then forwarded to at least those systems holding one or more of the subset of files requiring a scan.

Thus, a method of checking for computer viruses can be implemented such that a full antivirus scan executes only once for each file unless the file is changed, even if a copy of the file is present on multiple data processing systems. The antivirus program can also run on the individual system, such as in case of an emergency, at a user's request, or in response to an update to virus definitions.

As mentioned above, a virus checking method according to one embodiment of the invention identifies and takes account of the replication of files within the network to avoid virus-scanning identical files on every individual data processing system. This feature can be implemented as an additional feature, which complements the above-described comparison of hash values to identify files which have not changed.

Figure 9:
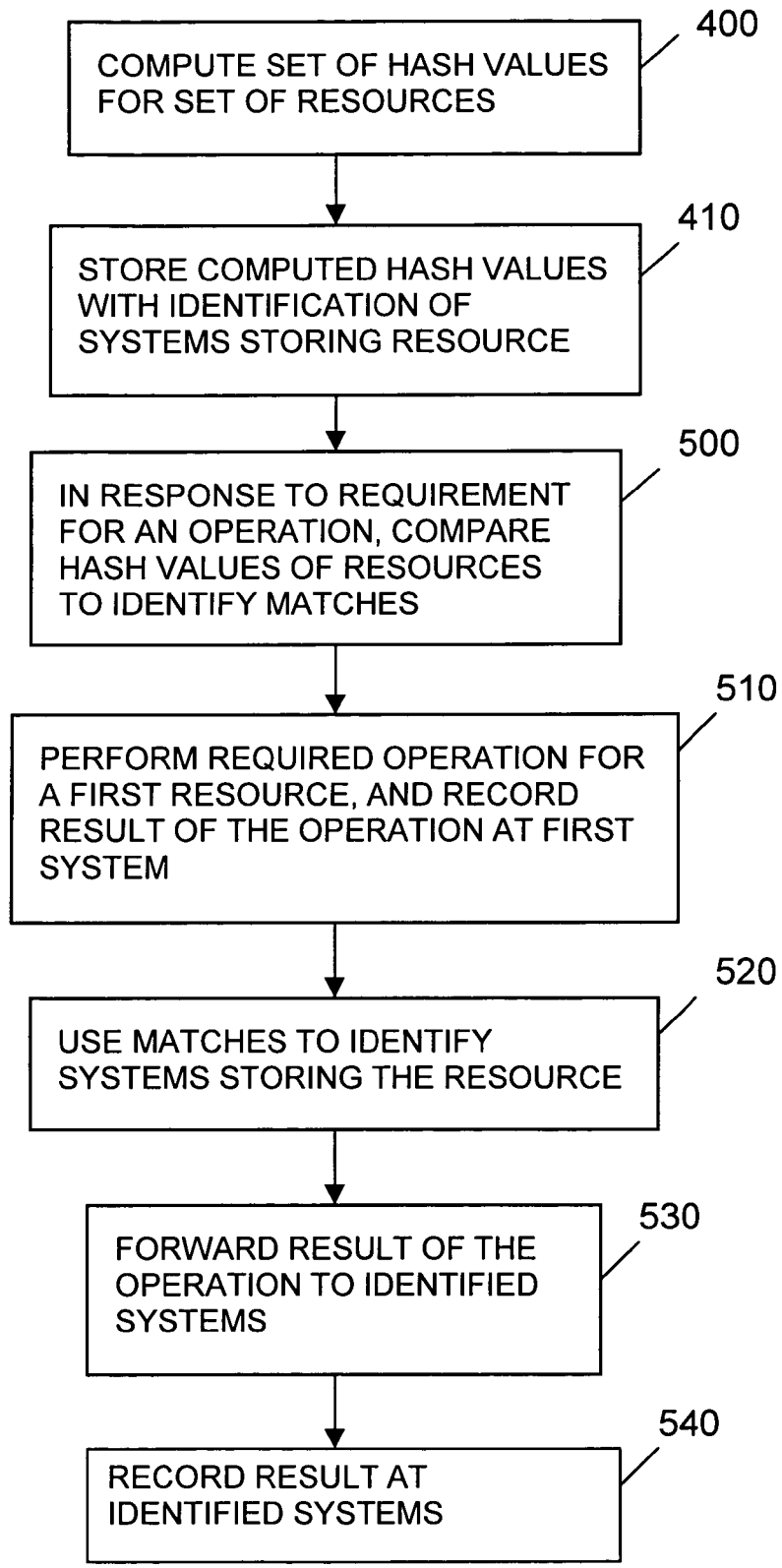
FIG. 9 is a flow diagram showing the steps of a method according to a further embodiment of the invention.

However, in alternative embodiments of the invention, the feature of identifying replicas by comparison of hash values may be implemented independently of the feature of identifying unchanged files by comparison of hash values. Furthermore, the feature of using secure hash values to identify replicas may be applied to reduce repetition of operations other than virus scanning. FIG. 9 shows a sequence of steps of a method for identifying replicas and avoiding repetitive performance of a specified operation for replicas of a resource. Periodically, or in response to a requirement for performance of a specified operation, systems within a LAN or network region (referred to hereafter as 'the LAN' for simplicity) compute 400 a set of hash values for resources stored on the respective systems. A secure hash function is applied to a bit pattern representing each resource for which a hash value is required. Each system then sends the computed hash values for locally stored resources to a pool server within the LAN. A coordinator program running on the pool server controls a repository manager to update 410 a repository of hash values representing a set of resources distributed across a plurality of systems within the LAN. The repository holds the hash value for each resource and an identification of the system on which the resource is stored.

A specified operation may be invoked by a user request or by expiry of a timer controlling periodic performance of the operation. The operation may be a virus scan performed at an end-user system within the LAN, or performed at the pool server. The operation may be a backup copy operation, or a combination of backup and virus check using a single read of a resource from secondary storage. When the specified operation is invoked at one of the systems within the LAN, a check is performed 500 of the hash values stored at the pool server. The check identifies replicas of resources within an individual system or distributed across the plurality of systems in the LAN, by identifying matches between hash values stored for different resource instances. A match between two hash values derived from applying a secure hash function to each resource's bit pattern demonstrates that the resource instances are identical replicas, since secure hash values are unique representations of the resource instance. The coordinator program retrieves 520 from the repository an identification of the systems within the LAN which hold replicas of a resource. When the specified operation is performed 510 in relation to a resource, a result of performing the operation is recorded at the system which performed the operation. The result is also sent 530 to each of the identified systems holding replicas of the resource. The result of the operation is then stored 540 at the identified systems. Such a method enables records to be updated at a plurality of systems within a LAN in response to performing the operation once in relation to one of the replicas of the resource within the LAN, and relying on matching hash values to identify replicas of the resource for which the same result can be recorded without repetition of the operation. For example, a virus scan may be performed at the pool server or one of the other systems within the LAN and the result of the virus scan may then be communicated to other systems in the LAN without repeating the virus scan for every replica of the resource. Where the set of resources include executable files which have a replica on every system in the network, or the resources include compressed groups of executable files and/or data files, the ability to avoid unnecessary repetition of the operation may provide efficiency and performance improvements. As a second example, a backup copy of a resource may be stored at the pool server and the plurality of systems holding copies of the resource may receive a confirmation that the backup has been performed at a particular time—avoiding the need for multiple replica backups.

Another alternative to the embodiments described in detail above applies the methods of hash value computation and comparison to determine which resources do not currently require a backup copy operation. A comparison of hash values is performed to determine which files are unchanged and can therefore be skipped in the current backup. The hash value computation and comparison ("snapshot") process can be configured to run periodically or a user can initiate the process. Data from all the computation and comparison snapshots across the network can then be integrated to a unified network-wide view of stored resources and their virus-contamination status.

Described above is a distributed client-server approach to detection of and possible corrective action against viruses, which can be used to reduce data transmission and reduce duplication of virus scanning within a computer or network. This can increase the efficiency of antivirus processing compared with typical known techniques. According to one embodiment, the antivirus program on the client system schedules the hash value computation process on the client system. On a cooperating server system, a new hash value (MD) computed by the message digest function triggers scanning of the corresponding file for any viruses, using the latest virus definition files. If the scan determines that a file is free of known viruses, the antivirus program running on the server classifies the file and the associated hash value (MD) to be virus-free. The antivirus program adds the new hash value (MD) to the list of virus-free hash values. If the same hash value is received from another computer system, the antivirus program running on the server is able to certify the corresponding file and hash value to be virus free without repetition of the virus scan.

If a virus scan determines that a file is infected by a virus, the hash value (MD) for that file is classified as infected and a notification of the infected state is sent to the system on which the file is stored. The user can take suitable corrective actions, such as is known in the art, or the antivirus program running on the server may disinfect the file and provide the disinfected version of the file to the user's system.

When new virus definition files are added into the antivirus programs, the list of files whose hash values have previously been classified virus-free can be rescanned using the new virus definitions, for example as a background process during periods of relatively low processing activity. This process should identify files infected before the relevant virus definition was known. If the result of the rescanning is that some files previously classified as virus-free are now reclassified as infected, the virus scan coordinator program running on the server sends the list of infected files to at least the systems holding copies of those files.

If a virus was known to have been created after a file was virus-scanned and classified as virus free, an identification of matching hash values could still confirm that the file is not contaminated by that virus. This statement is true even if the initial virus scan was incapable of recognizing the new virus. Since the virus could not have contaminated the file before the virus existed, the original hash value represents a resource which could not have been infected by that virus at that time. However, because of the difficulty determining the date of creation of a virus, one embodiment of the invention re-scans each resource each time new virus definitions become available. Described in the following paragraphs is an alternative to re-scanning all files as soon as new virus definitions become available. The alternative includes prioritizing re-scanning according to the likelihood of infection by a previously undetected virus.

Periodically, hashes of the files on client data processing systems are reported to the pool server. The pool server records the information about the source of the hash and the time at which it was found to exist. Antivirus scanning is performed for all files corresponding to newly discovered hashes that do not already exist in the pool server's repository of hashes. The scanning may be performed either on the pool server or on the client data processing system at which the resource is stored. However, those hashes that were at least twice observed on the network and found to be virus-free in all previous virus scans are treated in a special way. The hash value corresponding to a resource is time-stamped when a virus scan is performed—this applies to all resources. If the difference ($T2-T1$) between the earliest and latest timestamps ($T1$ and $T2$) of virus scans of a resource exceeds a certain threshold (which may be a user-configurable parameter) and the hash value of the resource is unchanged since $T1$, the resource is classified a low priority resource for virus scanning. The threshold period must be sufficient that there is only a low likelihood that a virus could have existed at time $T1$ and yet remained undetected by virus scans up to and including the scan at time $T2$.

If virus definitions are changed, the low priority resources are not re-scanned immediately but instead their re-scanning is deferred until a period of very low system activity. In some cases, the resources may be excluded from the requirement for a virus scan and confirmed as 'virus free' without applying the new virus definitions, on the basis that the likelihood of infection prior to $T1$ is very low for a given time difference ($T2-T1$).

The current antivirus scan, which is performed due to the availability of new virus definitions, is therefore applied to any new bit patterns found within the network and other resources not classified as low priority, since these resources are far more likely to contain viruses than those classified as low priority. If the files classified as low priority for virus scanning are scanned later, when system usage is low, any virus which is identifiable using the new virus definitions will eventually be identified.

Typically, a large percentage of all the files on the network would be classified as low priority for virus scanning, and so the deferral of re-scanning may provide a significant optimization. The deferral may defer identification of viruses which existed at time $T1$ and were undetected by time $T2$, but this risk may be considered acceptable if the deferral of virus scanning for some resources enables more efficient use of processing cycles. This is explained below. Since the match between hash values confirms that no virus infection has occurred since time T1, and no virus was detected in the scan performed at time T2, the only possible virus infections are viruses which infected the resource before time T1 and yet remained undetected at time T2. For at least the viruses which replicate themselves efficiently, the probability of the virus remaining undetected decreases very quickly over time. Therefore, the proportion of viruses which could have existed at time T1 and yet remained undetectable by antivirus programs until time T2 can be assumed to be very small for a suitably large period (T2−T1). Since the probability of a virus infection is therefore very low given matching hash values and a suitable large period (T2−T1), rescanning in response to new virus definitions can be deferred until a convenient time at relatively low risk.

In the embodiments described in detail above, a local antivirus program 90, 100 performs an initial virus scan for resources running on the local system, whereas subsequent virus scans may be performed on the pool server or on each system in the network as required. In an alternative embodiment, all virus scanning including the initial scan is performed at the pool server under the control of the virus scan coordinator program 100. In the latter case, the client antivirus program 90 running on other systems in the network performs the computation of hash values and communicates with the virus scan coordinator program 100 on the pool server. Decontamination actions may be performed on the pool server or at each system as required.

A further embodiment of the invention enables prioritization of virus checking for different resources within the network, for processing optimization and to focus virus scans where risks are highest, as described below.

Figure 7:
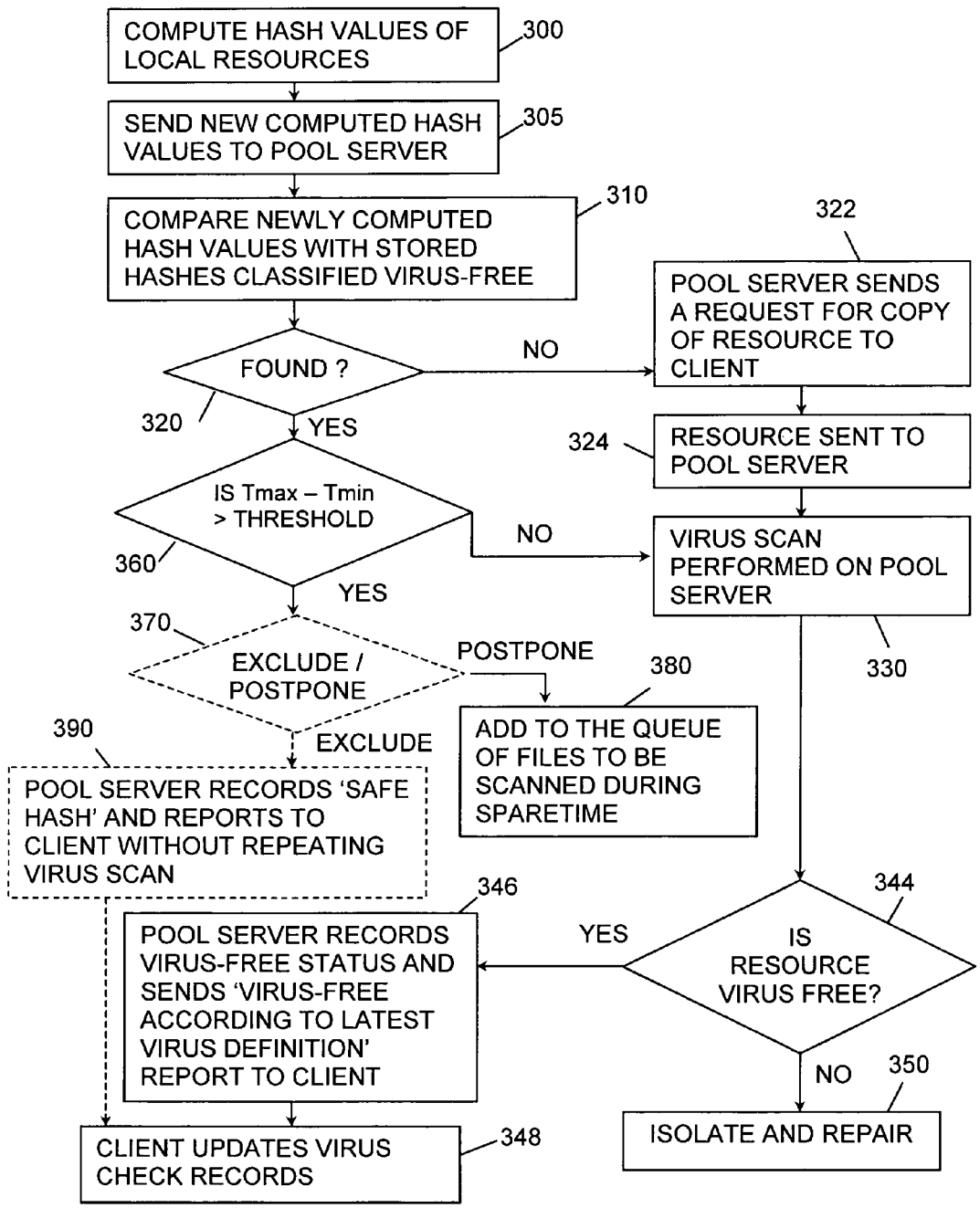
FIG. 7 is a flow diagram showing the steps of a method according to an alternative embodiment of the invention.

FIG. 7 shows an embodiment of the invention in which virus scanning is employed on the pool server for the following set of resources: resources which do not have hash values in the pool server; and resources which do have a hash value within the pool server but have not been classified a low priority for virus scanning. However, virus scanning is deferred for resources classified as low priority, or the resources are excluded from the requirement for a virus scan. Consistent with the embodiment shown in FIG. 6, hash values are computed 300 at a data processing system for locally stored resources, and the computed hash values are sent 305 to the pool server. The repository 400 on the pool server is searched 310 for matches between the newly computed hash values and stored hashes representing resources previously classified as virus-free. If no matching hash value is found 320 within the stored 'virus-free' hash values, the method proceeds as shown in FIG. 6. That is, the pool server sends 322 a request for a copy of the resource to the client data processing system which holds the resource. The resource is sent 324 to the pool server and a virus scan is performed 330 on the pool server. If the scan determines 344 that the resource is virus-free, the pool server updates 346 its records and sends 346 a 'virus free' report to the client data processing system at which the resource is stored. This report is an indication that the resource is classified virus-free according to the latest virus definitions used in the scan. The client system then updates its virus check records.

However, according to the embodiment of FIG. 7, a positive match between newly computed and stored hash values does not necessarily result in the resource corresponding to the matched hash values being declared virus-free. Firstly, a check is performed 360 of the timestamps associated with the previous virus scans of the resource. These timestamps are held together with the hash values in the repository at the pool server. If the time period between the earliest and most recent virus scans of a resource (that is, the difference between time Tmin and Tmax) exceeds a threshold, the resource is considered a low priority resource for virus scanning. In one implementation (A), an identifier of each low priority resource is added 380 to a queue of resources to be scanned during spare processor cycles when use of the computer system is low. In another implementation (B), all low priority resources are simply excluded from the current requirement for a virus scan, and the pool server records 390 a virus-free status without repeating a virus scan. In a third implementation (C), a determination 370 is made regarding whether to exclude or postpone virus scanning for a low priority resource. The determination 370 may be based on the type of resources or on the type of event which initiated the current virus check (timer expiry or user initiation). The choice between the three optional implementations (A, B, C) of this embodiment is made according to the level of protection from viruses required for the network.

A further embodiment of the invention enables identification of systems having a vulnerability to virus attacks, by identifying which systems hold copies of resources associated with a vulnerability. Computer program vendors and their corporate customers often notify computer end-users of vulnerabilities associated with particular computer programs such as operating systems. Vulnerabilities may also be associated with mail clients, Web browsers and servers and database programs, for example, and may include vulnerabilities to hackers as well as to viruses. End users are typically required to follow a first set of instructions to determine whether their system is vulnerable, including checking which version of the operating system (or other program) is installed on their system and comparing with available information regarding vulnerabilities and available fixes including patches, service packs and/or replacement program versions. The following description refers to 'patches' as a representative example resolution, but should not be interpreted as a limitation of the invention. The user must then carry out a second complex set of instructions to resolve the vulnerability—for example, locating and downloading a patch, installing the patch and rebooting the system.

This known approach to managing vulnerabilities to virus attacks and hacking is unreliable, since users may delay or ignore the instructions to remove a vulnerability. Additionally, modern businesses cannot afford the management time involved in coordinating such a resolution process throughout the organisation. A possible solution may involve a network administrator maintaining a database which identifies the resources on each system, and then controlling on-line distribution of patches or new versions of a resource. A practical problem arises for such a centralized management and 'push' distribution of patches in terms of how to maintain records of the set of resources on each system and how to audit performance of the resolution. This is especially problematic in large networks and networks including wireless connections, and where individual users are able to download resources without requesting the resources via a system administrator or even informing an administrator.

In many cases, a vulnerability arises due to the presence of a particular resource—such as particular versions of a computer program—or is recognizable from the presence of certain files. A secure hash value can be used as a convenient identifier which uniquely and consistently represents such files to determine which systems have vulnerabilities, to specify which resources need resolution of a vulnerability, and to automatically confirm that the pre-requisite programs for installing and running a patch or service pack are available on a system.

Figure 8:
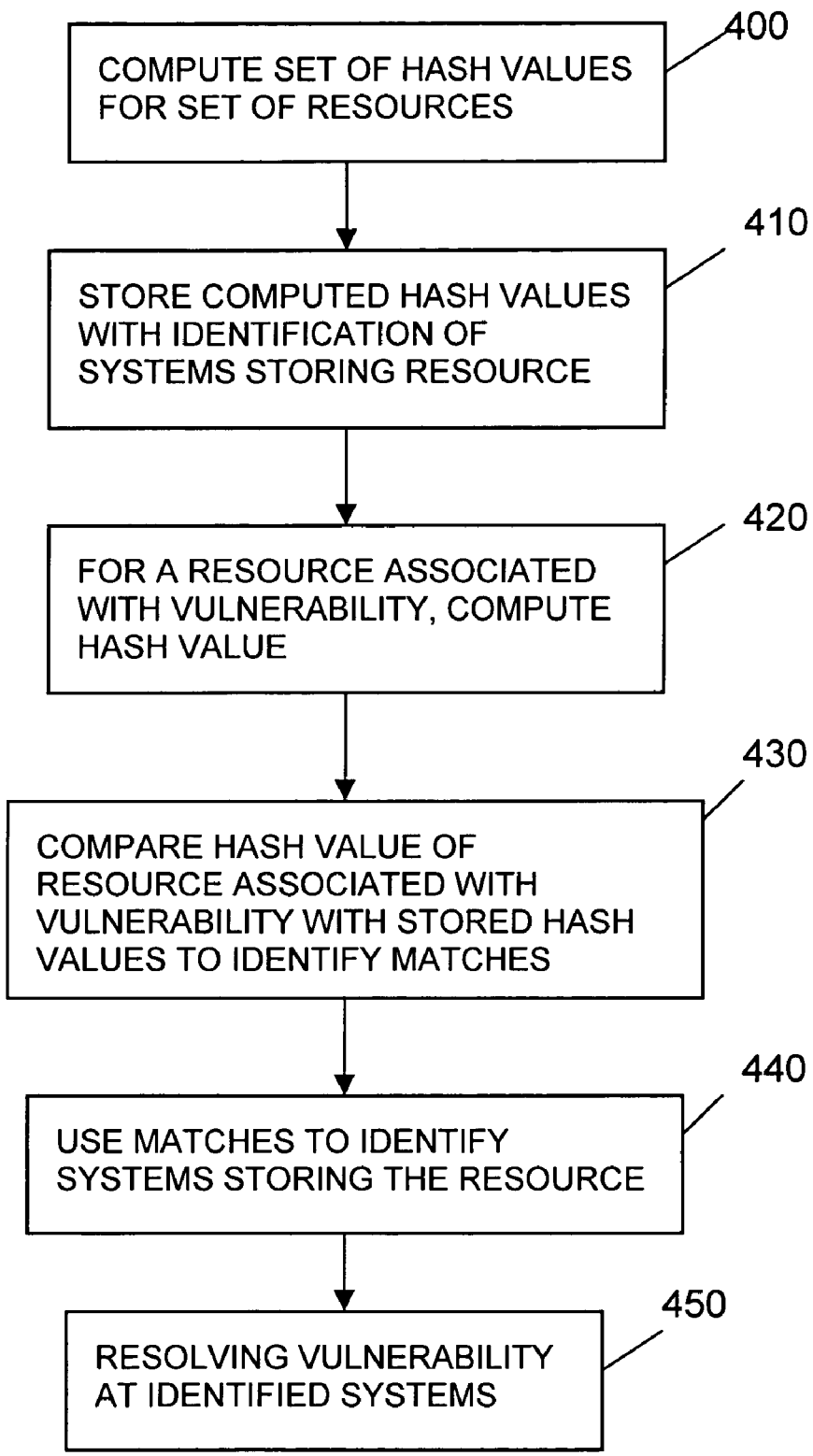
FIG. 8 is a flow diagram showing the steps of a method according to a further alternative embodiment of the invention.

Referring to FIG. 8, and similar to the methods described above, hash values may be computed 400 for resources of a plurality of data processing systems in a network and then stored 410 in a repository at a connected server data processing system. According to the method of FIG. 8, if a vulnerability to viruses is identified for a particular resource, a hash value is computed 420 for the resource associated with the vulnerability. This computation of a hash value may be performed on the system storing the resource or remotely. The hash values in the repository are compared 430 with the computed hash value for the 'vulnerable' resource to identify matches. Matching hash values indicate replicas of the 'vulnerable' resource, and so the hash values can be used to test 440 for replicas at any of the data processing systems within the network for which the repository holds hash values. Having identified the vulnerable systems which include the resource, action can be taken 450 at each system to remove the vulnerability.

For example, version 1 and version 2 of a program may include a vulnerability, whereas the vulnerability is removed when developing version 3. Hash values are generated 420 by applying a secure hash function to the respective bit patterns of version 1 and version 2. The repository of hash values is then searched 430 for hash values matching the hash values generated for versions 1 and 2 of the program, to identify 440 systems within the network at which copies of version 1 or version 2 of the program are installed. Hash values can be used to check for any software which is a pre-requisite for installation or execution of Version 3 of the program. Version 3 of the software, or a code patch, can then be automatically sent to the identified systems to remove the vulnerability or replace 450 the vulnerable versions.

Alternatively, a user can be sent a vulnerability report prompting user action to resolve 450 the specific vulnerabilities relevant to their computer system. This latter alternative has the advantages of enabling selective reporting of vulnerabilities to only a relevant set of users, and enabling the vulnerability-resolution instructions sent to each user to be directly relevant to their system's vulnerabilities (instead of sending multiple sets of instructions and relying on the user to select the relevant instructions after confirming which software version they are running). Each of these alternative approaches simplify the end-user's task of resolving vulnerabilities, and so increases the likelihood that all users will promptly remove the vulnerability.

A particular implementation of vulnerability identification and resolution is described below. Let us assume that a software product vendor announces vulnerabilities in their software, and corresponding patches, as a standard programmatically-accessible service. The presence of a particular set of resources on a computer system indicates the existence of a vulnerability. Employing the unique resource identification characteristics of secure hashes, the vulnerability can be expressed as a logical combination of the presence of resources with one or more hashes. In the following example representation, the symbol '&' implies all hashes must be present and the symbol 'OR' implies one of the hashes (or sets of hashes) is sufficient to indicate a vulnerability.

For example, a particular set of vulnerabilities may be represented as follows:

1. $(H_1$ & $H_2$ & $H_3)$ OR $(H_4$ & $H_5)$=>"MS03-040"=>"KB828750"=>$H_6$>>>$H_{21}$
2. $(H_7$ & $H_8$ & $H_9)$ OR $(H_{10}$ & $H_{11}$ & $H_{12}$ & $H_{13})$=>"MS03-040"=>"KB828750"=>$H_{20}$, $H_6$>>>$H_{22}$ & $H_{23}$
3. $(H_{14}$ & $H_{15}$ & $H_{16}$ & $H_{17}$ & $H_{18})$=>"MS03-039"=>"KB824146"=>$H_{19}$>>>$H_{24}$

In the above example, $H_1,H_2,H_3,H_4,H_5,H_7,H_8,H_9,H_{10}, H_{11},H_{12},H_{13},H_{14},H_{15},H_{16},H_{17},H_{18}$ represent hashes of resources that correspond to a vulnerability; "MS03-040", "MS03-039" are vulnerabilities; and "KB828750", "KB824146" are patches for removing the vulnerability. $H_6,H_{19},H_{20}$ are hashes corresponding to patches (which need to be executed on the vulnerable system to remove the vulnerability). In the above example, the ordering of hashes representing patches indicates the order in which patches should be applied (for example, $H_{20},H_6$ indicates that the patch $H_{20}$ should be executed before executing the patch $H_6$). In the above example, $H_{21},H_{22},H_{23},H_{24}$, indicate hashes that show that the vulnerability is fixed.

Some patches are installed on a system as one or more separate files (such as file KB828750 with hash value $H_6$) which will be executed together with the resources associated with a vulnerability, whereas others will modify the original resources. In the former case, the presence of a first set of hashes (such as $H_4$ & $H_5$) may not indicate the existence of a vulnerability if the hash value $H_6$ is also present. For example, a vulnerability may be represented as:

$(H_4$ & $H_5$ & $\sim H_6)$=>"MS03-040"=>"KB828750"=>$H_6$>>>$H_{21}$

In certain cases, vulnerability elimination may involve replacement of a resource without execution, as may be indicated by a simple hash replaces hash operation.

The hash information provided above may optionally also indicate:

a. a specific directory (hard-coded) where this resource must be located;
b. a relative path where this resource must be located; and/or
c. a path based on registry contents or an equivalent (such as in the case of Microsoft Corporation's Windows operating system, in which the Windows registry contains information relating to an application's installation directory).

Additional information may be made available regarding which patches can be executed together before rebooting, to enable a reduction of the total number of reboots required during patch or service pack installation.

Vulnerability information from various vendors can be consolidated and made available to system administrators. The system administrators may declare a subset of the patches as critical.

The corresponding resources required for removing vulnerabilities, including vulnerability definitions, patches and service packs may be distributed to a plurality of pool servers. Each pool server services a respective LAN as described above. This can provide each system within a LAN which is serviced by a pool server with improved access to the resources needed to remove vulnerabilities. Users may be automatically notified, for example through mail or a program that runs at boot-up time which checks for vulnerability information on the pool server.

Using information from a previous virus scan, or by executing a search for hashes, a determination is made of the vulnerabilities in the system. A vulnerability definition may contain a small piece of code that executes on a client system and returns a Boolean value indicating the presence or absence of a specific vulnerability. Each system identifies hashes for all patches to be downloaded and installed in accordance with a vulnerability definition, and contacts the pool server and specifies the corresponding hashes to obtain the relevant files.

An optimal installation and reboot sequence is determined for the installation of patches and/or service packs, and the user is presented with the option to start installation. The user may be provided with a selection of alternative sequences from which to choose. The user may also be given the option to postpone installation. If postponement is selected, the user is reminded periodically until the patch is installed.

Once an installation sequence has been selected, the installation proceeds. While invoking the patch, an instruction to Reboot or Not Reboot may be generated according to the particular chosen optimization. A special command line parameter may be used to invoke the patch with or without a reboot.

When an antivirus program runs on a system (as described previously), a determination can be made regarding whether the vulnerability has been resolved on a particular system or not by comparison of hash values. A dedicated verification agent may be executed to verify the removal of the vulnerability. The result of the determination an/or verification can then be made available to system administrators periodically (for example as a weekly aggregate of vulnerability reports, or daily or in response to user or administrator requests). Various statistical reports, graphs and maps may be provided as required.

One specific solution for making vulnerability and vulnerability resolution information accessible uniformly (from multiple software vendors) is to make the information available as a Web Service using extensible markup language (XML). Additional text information could be provided with a detailed description of a vulnerability, to describe the vulnerability to various users or system administrators.

For antivirus and backup applications of the message digest function, the computation of hash values may be scheduled to execute periodically for a system, such as once per week. Frequently used and important files on the system may be monitored more frequently, by configuring the message digest function to run for a subset of files at specific times or when processor usage is low. For example, a timer determining expiry of a defined inactivity period may trigger execution of the message digest function at the same time as triggering display of a screen saver. Additionally, the message digest function may be initiated by user inputs, and a graphical user interface may be modified to provide a selection point (button or menu list item) for the message digest function.

A further embodiment of the invention uses statistical observation of the pattern of creation of new hashes to identify sudden changes within a network. For example, if newly computed hash values are compared with stored hash values and a large number of copies of a specific hash value $MD_1$ can be seen to have changed, this implies that the corresponding copies of the resource represented by hash value $MD_1$ have also changed. This could mean that a group of users are upgrading from one file version to another (for example if $MD_1$ consistently changes to $MD_2$) or that a virus is spreading through the system. The latter is most likely if a large number of copies of $MD_1$ have remained unchanged for a long period and are then suddenly replaced by a large number of different hash values—indicating the probable spread of a polymorphic virus. The comparison of hash values can be used once again to determine which resources require a virus scan and which do not.

The monitoring of hash values to identify changes to files may be implemented for a set of decoy injectable files distributed throughout a network. The hash values for these files should never change, whereas other files may change due to upgrades, user modifications, etc. Therefore, any changes to the hash values representing a file on one of the systems in the network implies at least the need for a virus scan for that system. Use of dummy decoy files (referred to as 'honey pots') is well known for detection of computer hacking, but could also provide a warning of the presence of a virus. According to an embodiment of the invention, infectable files (such as a collection of small .exe files) are distributed within a randomly chosen subset of folders on a mail server. A virus could not easily identify the .exe files as decoys. The hash values for the decoy .exe files are stored on the system and the decoy locations and hash values are stored on the pool server. The local antivirus program checks the hashes of these files with the hashes stored at the pool server when performing a virus check of the system. If one of the hash values of a decoy file is seen to have changed, the virus scan coordinator running on the pool server generates an alert. The pool server may notify a system administrator, and instruct the system holding the decoy file to disconnect from the network or shut down. Such a check of hash values of decoy files may even identify the presence of a virus which is not yet recognizable by the virus definitions of the antivirus software running on the infected system, thereby enabling containment of a virus attack.

It is common within many organizations for antivirus policies to be implemented such that most systems are initially configured to perform virus checking on a particular default day such as Monday of each week. Although users can change this initial configuration, many users do not adjust configuration settings of background tasks. A virus released one day after such a default day for virus checks would have more chance of spreading though the organisation's computing environment—a window of opportunity of one week if users rely on their weekly default virus check. A solution to this potential vulnerability is to employ random (or pseudo-random) selection of a default day for each system's initial virus scan configuration settings. This may provide a more uniform distribution of virus scanning for systems within the organisation, and can spread the load on a virus-coordinating server over a number of days. An example of a qualified or 'pseudo-random' approach may involve excluding days such as weekends and public holidays when systems are not switched on. Alternatively, the initial configuration settings may be managed more actively to achieve a more uniform spread—such as by reducing the number of systems initially configured to perform default scanning on a Thursday if many users actively select Thursday as the day for performing background virus checks.

It will be clear to persons skilled in the art that additional variations and alternatives to the above-described embodiments are achievable within the scope of the present invention as set out in the claims.

What is claimed is:

1. An apparatus comprising:

a processor; and a storage device connected to the processor, wherein the storage device has stored thereon a program, wherein the processor is configured to execute instructions of the program to implement a method comprising the steps of:

updating, at successive update times, virus definitions for resources stored on a data processing system;

scanning the resources for viruses in first and second scanning instances responsive to the virus definitions updated at respective first and second ones of the update times;

computing hash values for the resources at the first and second update times;

classifying each of the resources as higher or lower priority responsive to whether the hash values for each resource are equal for the first and second update times and whether the scanning determines each resource is virus free in both the first and second scanning instances;

determining a scanning interval from a time of the first scanning instance until a time of the second scanning instance;

updating the virus definitions at a next update time; and scanning resources for viruses in a next scanning instance responsive to the virus definitions updated at the next update time, wherein in the next scanning instance the ones of the resources classified as higher priority are scanned and the scanning of the higher priority resources in the next scanning instance includes scanning i) resources determined to be virus free in both the first scanning instance and the second scanning instance but not having equal hash values in the first and second update times, ii) resources determined to be virus free in both the first scanning instance and the second scanning instance and having equal hash values in the first and second update times but wherein the scanning interval is less than a predetermined threshold, iii) resources determined to be virus free in the first scanning instance and having equal hash values in the first and second update times but wherein the scanning interval is less than a predetermined threshold, and iv) resources determined to be virus free in the second scanning instance but wherein the scanning interval is less than a predetermined threshold.

2. The apparatus of claim 1, wherein the data processing system has activity intervals of higher and lower activity and in the next scanning instance the scanning of the ones of the resources classified as lower priority is performed during one of the lower activity intervals.

3. The apparatus of claim 1, wherein in the next scanning instance the ones of the resources classified as lower priority are not scanned.

4. A method comprising the steps of:

updating, at successive update times, virus definitions for resources stored on a data processing system;

scanning the resources for viruses in first and second scanning instances responsive to the virus definitions updated at respective first and second ones of the update times;

computing hash values for the resources at the first and second update times;

classifying each of the resources as higher or lower priority responsive to whether the hash values for each resource are equal for the first and second update times and whether the scanning determines each resource is virus free in both the first and second scanning instances;

determining a scanning interval from a time of the first scanning instance until a time of the second scanning instance;

updating the virus definitions at a next update time; and scanning the resources for viruses in a next scanning instance responsive to the virus definitions updated at the next update time, wherein in the next scanning instance the ones of the resources classified as higher priority are scanned and the scanning of the higher priority resources in the next scanning instance includes scanning i) resources determined to be virus free in both the first scanning instance and the second scanning instance but not having equal hash values in the first and second update times, ii) resources determined to be virus free in both the first scanning instance and the second scanning instance but wherein the scanning interval is less than a predetermined threshold, iii) resources determined to be virus free in the first scanning instance and having equal hash values in the first and second update times but wherein the scanning interval is less than a predetermined threshold, and iv) resources determined to be virus free in the second scanning instance and having equal hash values in the first and second update times but wherein the scanning interval is less than a predetermined threshold.

5. The method of claim 4, wherein the data processing system has activity intervals of higher and lower activity and in the next scanning instance the scanning of the ones of the resources classified as lower priority is performed during one of the lower activity intervals.

6. The method of claim 4, wherein in the next scanning instance the ones of the resources classified as lower priority are not scanned.

7. A computer program product including a tangible, computer readable medium, said computer readable medium having instructions stored thereon for execution by a computer system, wherein the instructions, when executed by the computer system, cause the computer system to implement a method comprising the steps of: updating, at successive update times, virus definitions for resources stored on a data processing system;

scanning the resources for viruses in first and second scanning instances responsive to the virus definitions updated at respective first and second ones of the update times;

computing hash values for the resources at the first and second update times;

classifying each of the resources as higher or lower priority responsive to whether the hash values for each resource are equal for the first and second update times and whether the scanning determines each resource is virus free in both the first and second scanning instances;

determining a scanning interval from a time of the first scanning instance until a time of the second scanning instance;

updating the virus definitions at a next update time; and scanning the resources for viruses in a next scanning instance responsive to the virus definitions updated at the next update time, wherein in the next scanning instance the ones of the resources classified as higher priority are scanned and the scanning of the higher priority resources in the next scanning instance includes scanning i) resources determined to be virus free in both the first scanning instance and the second scanning instance but not having equal hash values in the first and second update times, ii) resources determined to be virus free in both the first scanning instance and the second scanning instance but wherein the scanning interval is less than a predetermined threshold, iii) resources determined to be virus free in the first scanning instance and having equal hash values in the first and second update times but wherein the scanning interval is less than a predetermined threshold, and iv) resources determined to be virus free in the second scanning instance and having equal hash values in the first and second update times but wherein the scanning interval is less than a predetermined threshold.

8. The computer program product of claim 7, wherein the data processing system has activity intervals of higher and lower activity and in the next scanning instance the scanning of the ones of the resources classified as lower priority is performed during one of the lower activity intervals.

9. The computer program product of claim 7, wherein in the next scanning instance the ones of the resources classified as lower priority are not scanned.

* * * * *